United States Patent [19]
Sakamoto

[11] Patent Number: 5,495,895
[45] Date of Patent: Mar. 5, 1996

[54] TINE DEVICE FOR SOIL CONDITIONING AERATION MACHINE

[75] Inventor: Koichi Sakamoto, Ishikawa, Japan

[73] Assignee: Kabushiki Kaisha Sakamoto Seiki, Ishikawa, Japan

[21] Appl. No.: 263,668

[22] Filed: Jun. 22, 1994

[30] Foreign Application Priority Data

May 11, 1994 [JP] Japan ................................. 6-097595

[51] Int. Cl.$^6$ .................................................. A01B 45/02
[52] U.S. Cl. ............................... 172/22; 56/17.2; 111/170
[58] Field of Search ........................... 111/118, 127, 111/170; 172/21, 22, 41, 42, 49.5, 95, 125, 378; 56/17.1, 17.2

[56] References Cited

U.S. PATENT DOCUMENTS

| | | | |
|---|---|---|---|
| 2,030,770 | 2/1936 | Smith | 172/22 |
| 2,057,142 | 10/1936 | Fry | 172/22 |
| 3,830,310 | 8/1974 | Williams | 172/22 |
| 4,034,686 | 7/1977 | Collins | 172/22 X |
| 4,585,072 | 4/1986 | Martinez | 172/22 |

Primary Examiner—Eric K. Nicholson
Assistant Examiner—Robert Pezzuto
Attorney, Agent, or Firm—Oblon, Spivak, McClelland, Maier, & Neustadt

[57] ABSTRACT

A tine device for a soil conditioning aeration machine capable of replacing a tine with another in a simple motion. The tine is mounted onto a driving portion through a coupler having an internal member. The internal member has a body portion capable of being inserted into the tine and the coupler retains the inserted tine through movable steel balls. The steel balls are freed by pushing an outer cylinder of the coupler against the force of a coiled spring so that the tine may be removed/mounted in a simple motion.

7 Claims, 11 Drawing Sheets

TINE DEVICE FOR SOIL CONDITIONING AERATION MACHINE

BACKGROUND OF THE INVENTION

1. Field of the Invention

This invention relates to a tine device for a soil conditioning aeration machine for use in soil conditioning of a lawn surface to grow the lawn in a golf course or in a park.

2. Description of the Prior Art

Soil conditioning aeration machines are conventionally used in golf courses or in parks where a large area of lawn surface is provided.

In this type, a large number of vertically reciprocating tines are provided on the rear portion of a self-propelled machine body. By thrusting the tines into the ground, it is possible to form a large number of slender holes on the lawn surface in a regulated manner. It should be noted that what is referred to as a tine here is a pipe-like edged tool having a circular edge formed by thinning the forefront portion of a pipe material. The portion of the soil that is thrust by the tine may be raised onto the ground as a cylindrical core along the inner diameter of the tine. Further, the slender holes formed on the lawn surface function as the passage for causing rain water and air to permeate into the soil and may also be used in order to fertilize the lawn.

In a conventional aeration machine, the tines are generally firmly fixed one by one by means of screw to a tine driving portion of the machine body. Further, such aeration machine may also be used to properly mitigate the hardness of the turf in a race track.

Since such prior art aeration machine is constructed such that each tine is separately fixed firmly to the tine driving portion of the machine body by means of a screw, its changing takes time and the efficiency of operation as a whole is worse. Specifically, even a very small aeration machine is usually provided with the order of ten or more tines. While these tines are expendable and must be replaced with new ones after a half day or one day, the work time required for their changing cannot be ignored. In addition, since the tines are mounted on the lower portion of the machine, their changing operation is intrinsically laborious.

OBJECT AND SUMMARY OF THE INVENTION

In view of the above problems of the prior art, it is an object of the present invention to provide a tine device for a soil conditioning aeration machine, which makes it possible to change a tine with a simple motion by mounting the tine through a coupler, so as to greatly improve the work efficiency.

To this end, a first aspect of the present invention comprises a pipe-like tine, a coupler for removably mounting the tine onto the tine driving portion of a soil conditioning machine body and an internal member placed within the coupler, the internal member having a shaft portion capable of being inserted into the rear end portion of the tine.

The shaft portion is formed to have a sloped surface at a forefront portion thereof. Preferably, the angle of the sloped surface is coincided with the angle of an upper cutout of an elongated hole for drawing out soil which is formed at the barrel portion of the tine. Further, the coupler is preferably provided with a rotation stopper mechanism for stopping the rotation about the axis of the tine.

In its second aspect, the present invention comprises a pipe-like tine, an Internal member connected to the tine driving portion of a soil conditioning machine body, and a coupler for removably mounting the tine onto the internal member, the internal member having a shaft portion capable of being inserted into a rear end portion of the tine.

In its third aspect, the present invention comprises a pipe-like tine and a coupler for removably mounting the tine onto the tine driving portion of a soil conditioning machine body, the coupler having a through hole at the portion of the mounting, which is vertically in communication with the inner wall of the tine.

According to the first aspect of the present invention as described, since changing of the tine may be performed by means of the coupler with a simple motion, it is possible to greatly improve the work efficiency as a whole including the changing operation of the tine. Further, since the internal member has its shaft portion capable of being inserted into the tine, sway from side to side or unstableness of the mounted tines will not occur.

Further, when the angle of the sloped surface at the forefront portion of the shaft portion is coincided with the angle of an upper cutout of the elongated hole of the tine, a core which is the dirt taken into the tine is brought upward along the sloped surface of the internal member and may be smoothly discharged to the outside from the elongated hole. As a result, an internal clog of the tine and hence failure in digging a hole will not occur.

Furthermore, when the coupler is provided with a rotation stopper mechanism for stopping the rotation of the tine, the tine will not be rotated in relation to the internal member. There is thus no possibility of failure in discharging the core.

According to the second aspect of the present invention, the tine may be mounted/removed in a simple motion through a coupler onto/from the internal member which is connected to the driving portion, achieving similar advantages as those in the first aspect.

According to the third aspect of the present invention, since the coupler has a through hole communicating with the inner wall of the tine, the core within the tine may be smoothly discharged in the upward direction through the through hole. It should be noted that the tine in this case may or may not have an elongated hole formed at the barrel portion thereof.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

FIGS. 1 to 8 are related to the first aspect of the present invention; FIGS. 9 to 13 are related to its second aspect; and FIG. 14 is related to its third aspect.

Figure 1:
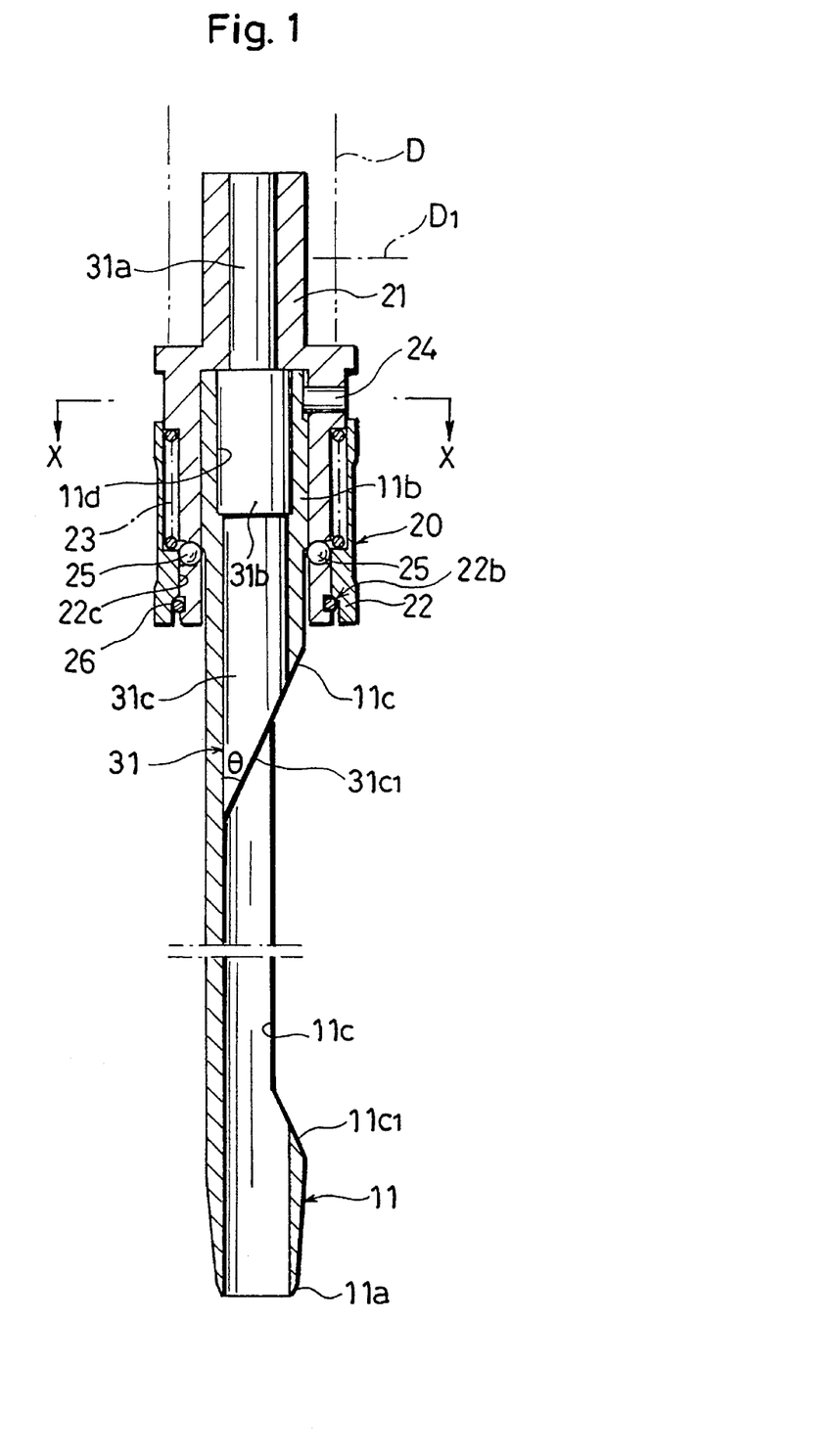
FIG. 1 is a cross sectional view showing the construction of a first embodiment of the present invention.
Figure 2:
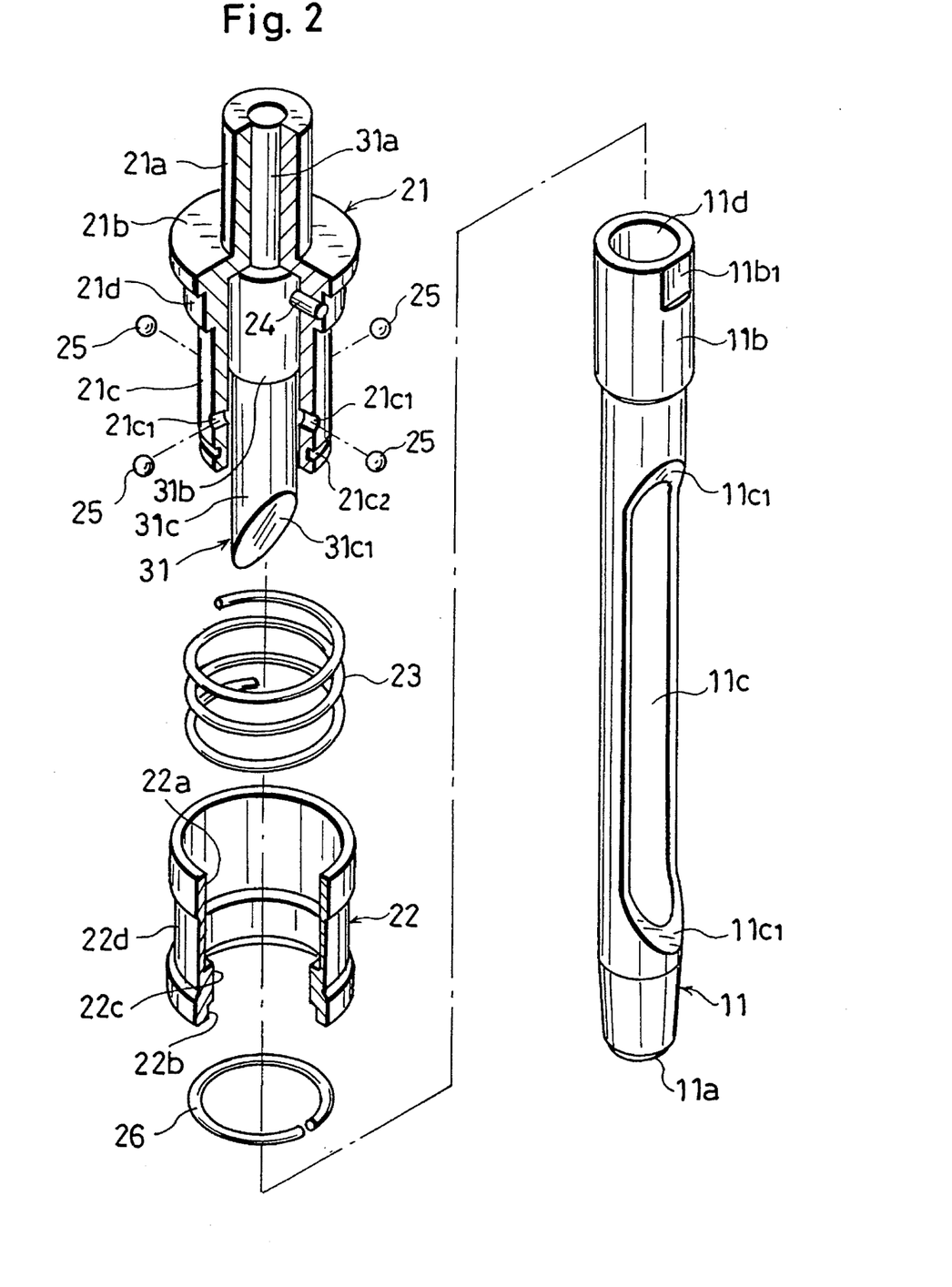
FIG. 2 is an exploded perspective view corresponding to FIG. 1.

As shown in FIGS. 1 and 2, a tine device for a soil conditioning aeration machine fundamentally consists of a pipe-like tine 11, a coupler 20 and an internal member 31.

The tine 11 has at a forefront thereof a circular edge 11a formed by thinning the forefront portion of a pipe material. It is also formed with a head portion 11b having a slightly larger diameter at the base end thereof and is formed with an elongated hole 11c for the driving out of soil, which is cut off at a barrel portion thereof between the forefront portion and the base end portion. A small beveling 11b1 is formed as a plane at a portion on the outer wall of the head portion 11b in alignment with the elongated hole 11c. Further, the upper and lower end portions of the elongated hole 11c are obliquely cut off, respectively, to form sloped surfaces 11c1, 11c1. It should be noted that the inner diameter of the tine 11 at its head portion 11b is slightly larger than the inner diameter of the barrel portion thereof at which the elongated hole 11c is formed.

The coupler 20 comprises a support 21, and an outer cylinder 22 which is fitted onto the outside of the support 21. A coiled spring 23 is equipped between the outer cylinder 22 and the support 21. The construction of each portion will now be described in detail.

The support 21 is integrally formed of a cylinder portion 21a at the upper end side, a flange portion 21b at the middle and a cylinder portion 21c at the lower end side (FIG. 2), the inner diameter of the cylinder 21c being adapted to fit onto the outer diameter of the head portion 11b of the tine 11. Further, the cylinder 21a is formed to have a slightly smaller diameter than the cylinder 21c. However, the upper end of the cylinder 21c continues to the flange 21b through a ring-like middle portion 21d which is larger in thickness than the cylinder portion 21c. The middle portion 21d has a through hole in the direction perpendicular to the support 21d, a knock pin 24 being driven into the through hole. Further, holes 21c1, 21c1 for accommodating steel balls 25, respectively, are formed equidistantly along the circumference at the lower portion of the cylinder 21c. In addition, a groove 21c2 for attaching a stopper ring 26 is formed at the lower end portion of the cylinder 21c. Here, for each through hole 21c1, a window having a diameter smaller than that of the steel ball 25 is opened toward the inner surface of the cylinder 21c. Accordingly, when accommodated within the through hole 21c1, the steel ball 25 will not fall into the interior of the cylinder 21c, though it may partially project into the interior of the cylinder 21c.

The outer cylinder 22 is a circular cylindrical member having at an upper portion thereof a larger diameter portion 22a for accommodating the coiled spring 23 and having a step portion 22b for engaging the stopper ring 26 on the inner surface at the lower end portion thereof. The portion between the step portion 22b and the larger diameter portion 22a is formed as a smaller diameter portion 22c which may fit onto the outer diameter of the cylinder 21c of the support 21. It should be noted that the larger diameter portion 22a is adapted to fit onto the outer diameter of the middle portion 21d of the support 21. Further, a wide and shallow groove 22d is formed on the outer wall of the outer cylinder 22.

The internal member 31 is internally located within the support 21. Specifically, the internal member 31 is a rod-like member having a smaller diameter attaching portion 31a formed on the upper end side, a larger diameter portion 31b formed at the middle portion thereof and a shaft portion 31c formed on the lower end side. It is constructed integrally with the support 21 by fitting the attaching portion 31a into the cylinder portion 21a of the support 21 from the bottom thereof. It should be noted that the outer diameter and the axial length of the larger diameter portion 31b correspond to the inner diameter and the axial length of the larger diameter portion 11d of the tine 11 (FIGS. 1 and 2), the outer diameter of the shaft portion 31c corresponding to the inner diameter of the tine 11. Further, the lower end of the shaft portion 31c is formed as a slope 31c1, the angle θ of the slope 31c1 conforming to the angle of the slope 11c1 of the upper cross section of the elongated hole 11c. Further, the length obtained by adding the larger diameter portion 31b and the shaft portion 31c at the shorter side thereof correspond to the length of the tine 11 from the upper end thereof to the upper cross section of the elongated hole 11c.

Figure 3:
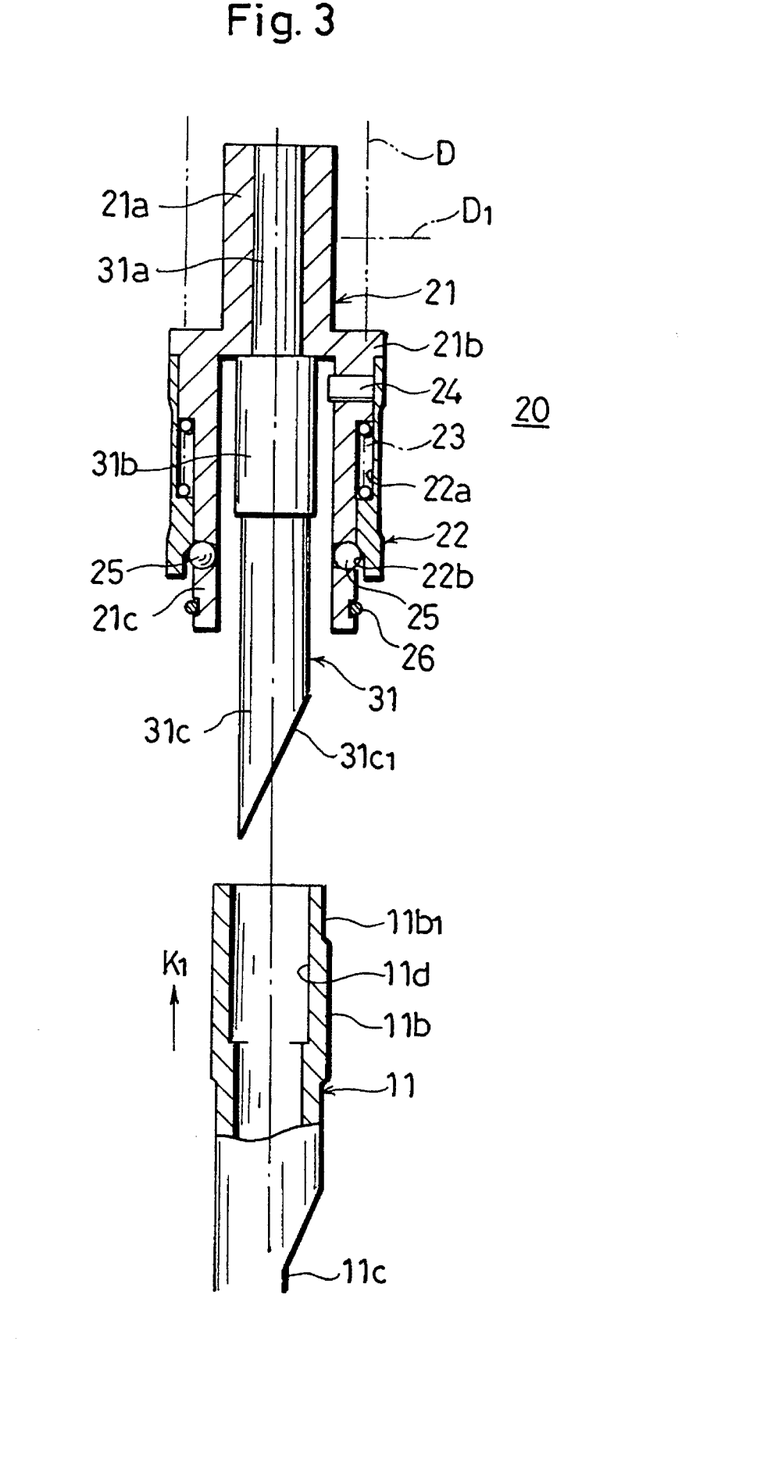
FIG. 3 is a cross sectional view with the tine as shown in FIG. 1 being removed.
Figure 4:
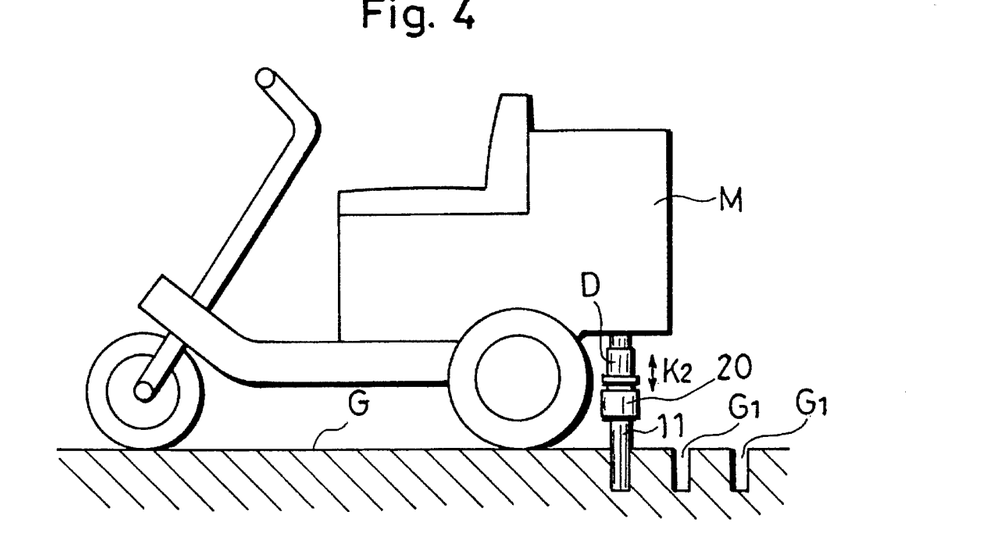
FIG. 4 illustrates the state where the tine device of FIG. 1 is attached to an aeration machine.

This coupler 20 may be assembled such that the outer cylinder 22 is fitted onto the cylinder 21c of the support 21 from the lower side thereof (FIG. 1, FIG. 3). At this time, however, the compression coiled spring 23 is accommodated in the larger diameter portion 22a of the outer cylinder 22 and steel balls 25, 25 are accommodated in the through holes 21c1, 21c1, respectively, of the support 21. Further, the stopper ring 26 is attached into the groove 21c2 of the support 21. The assembled coupler 20 may be fixed downward by means of a screw D1 to a tine driving portion D of a self-propelled machine body M (FIGS. 3 and 4).

While the outer cylinder 22 of the coupler 20 is urged downward by the coiled spring 23, it is adapted so as not to be pulled out from the support 21 as the stopper ring 26 engages the step portion 22b (FIG. 1). Further, at this time, since the steel balls 25, 25 are pushed inwardly from the cylinder portion 21c of the support 21 by the inner wall of the smaller diameter portion 22c of the outer cylinder 22, they may partially project from the inner wall of the cylinder portion 21c.

A description will now be given with respect to the case where the internal member 31 is attached.

When the outer cylinder 22 is pressed upward against the urging force of the coiled spring 23 (FIG. 3), the step portion 22b of the outer cylinder 22 is moved to the position corresponding to the steel balls 25, 25. Here, since the step portion 22b is formed to have a larger inner diameter than the smaller diameter portion 22c, the steel balls 25, 25 do not project toward the inside of the cylinder 21c and may be withdrawn toward the outside of the cylinder 21c. in this state, by inserting the head 11b of the tine 11 into the support 21 (in the direction of arrow K1 in FIG. 3) so as to insert the shaft 31c and the larger diameter portion 31b of the internal member 31 into the tine 11 and then by returning the outer cylinder 22 to its original position, the tine 11 may be attached with a simple motion to the coupler 20 (FIG. 1). This is because the steel balls 25, 25 engage the lower edge of the larger diameter head portion 11b and are able to prevent dropping out of the attached tine 11.

Figure 5:
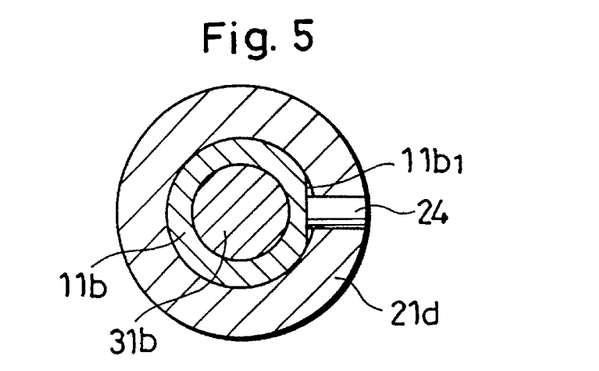
FIG. 5 is a sectional view taken along line X—X of FIG. 1 showing the rotation stopper mechanism.

It should be noted that, when attaching the tine 11, the tine 11 is to have the beveling 11b1 of its head portion 11b corresponding to the driven position of the knock pin 24 (FIG. 5). In this manner, the direction of the opening of the elongated hole 11c of the tine 11 coincides with the direction of the slope 31c1 of the internal member 31 (FIG. 1). Thereby, after the attaching of the tine 11, the slope 31c1 will be coincided, in the angles, with the slope 11c1 of the cutout at the upper side of the elongated hole 11c.

Since the machine body M with the tine 11 reciprocates the tine driving portion D up and down (in the direction of arrow K2 in FIG. 4) while itself is traveling, the tine 11 is able to successively form vertical slender holes G1, G1 on the soil surface G.

When the tine 11 is to be removed, it suffices to perform a procedure that is the inversion of the one performed at the time of its mounting. Specifically, the tine 11 may be pulled out from the support 21 in a simple motion (in the direction opposite to the arrow K1), by pushing the outer cylinder 22 upward so as to bring the step portion 22b to its position corresponding to the steel balls 25, 25 (FIG. 3).

The knock pin 24 of the coupler 20 is adapted so that, upon mounting of the tine 11, its forefront portion gently abut against the beveling 11b1 of the head portion 11b of the tine 11 (FIG. 5). That is, the knock pin 24 and the beveling 11b1 serve as a rotation stopper mechanism for preventing the rotation of the tine 11 in relation to the coupler 20.

Figure 6:
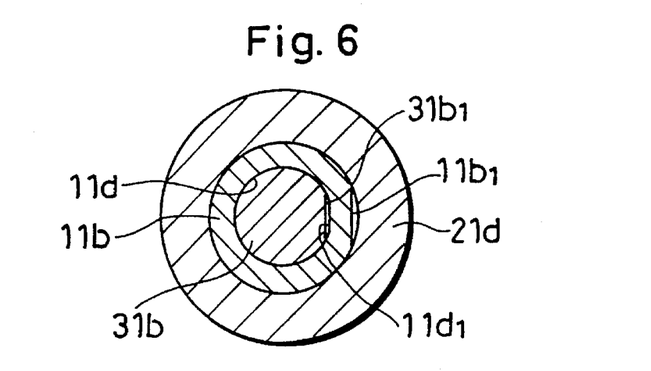
FIG. 6 is a sectional view showing an modification of the one shown in FIG. 5.

As shown in FIG. 6, the rotation stopper mechanism to be mounted on the coupler 20 may also be constructed by forming a flat portion 11d1 at a portion in the peripheral direction of the larger diameter portion 11d on the head portion 11b of the tine 11 and by forming a beveling 31b1corresponding to such flat portion 11d1 on the larger diameter portion 31b of the internal member 31. The inner and outer flat portions 11d1 and 11b1 of the head portion 11b may readily be formed such that the periphery of the head portion 11b is partially flattened in the diametrical direction thereof.

Figure 7:
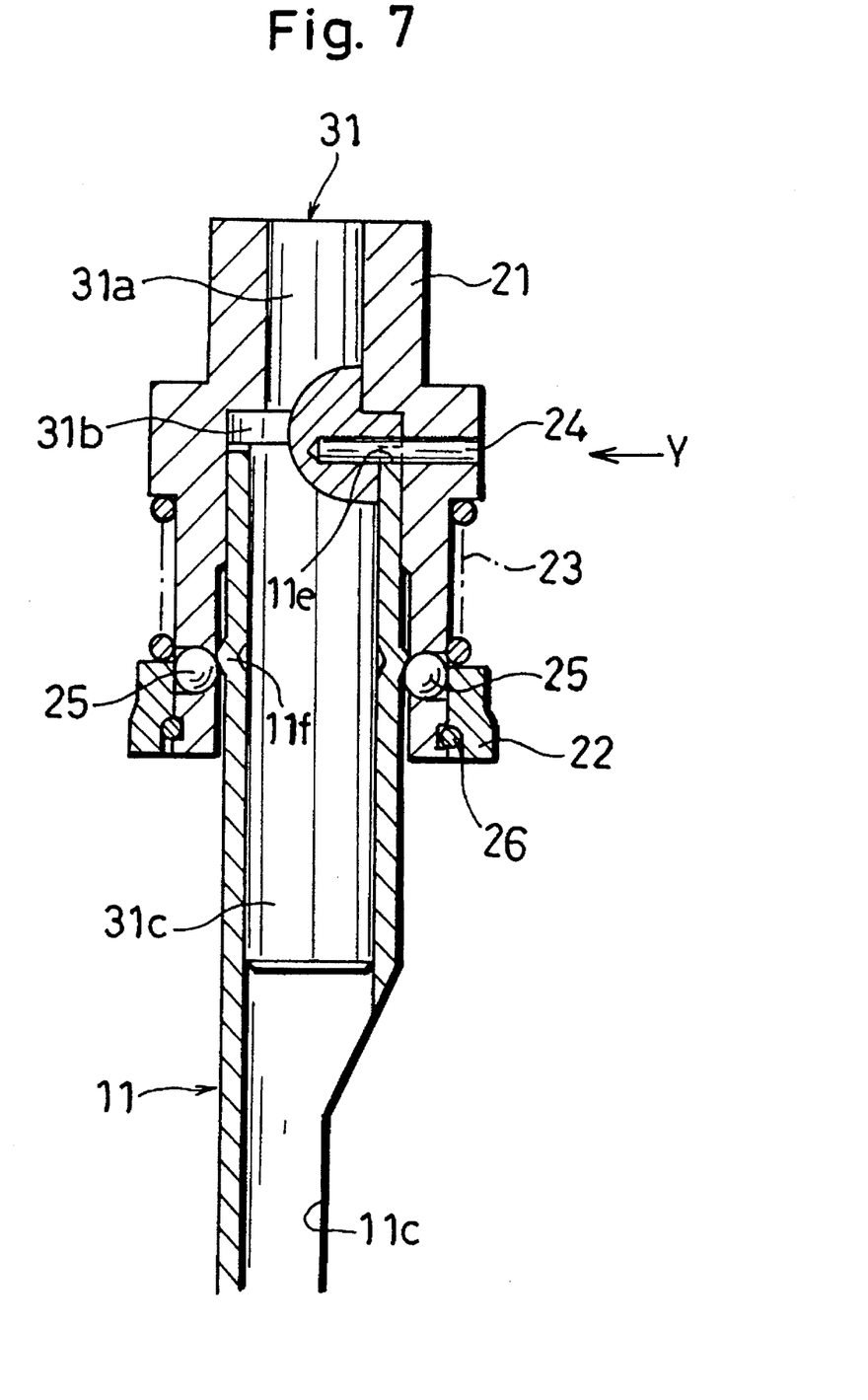
FIG. 7 is a sectional view showing another modification of the one shown in FIG. 5.
Figure 8:
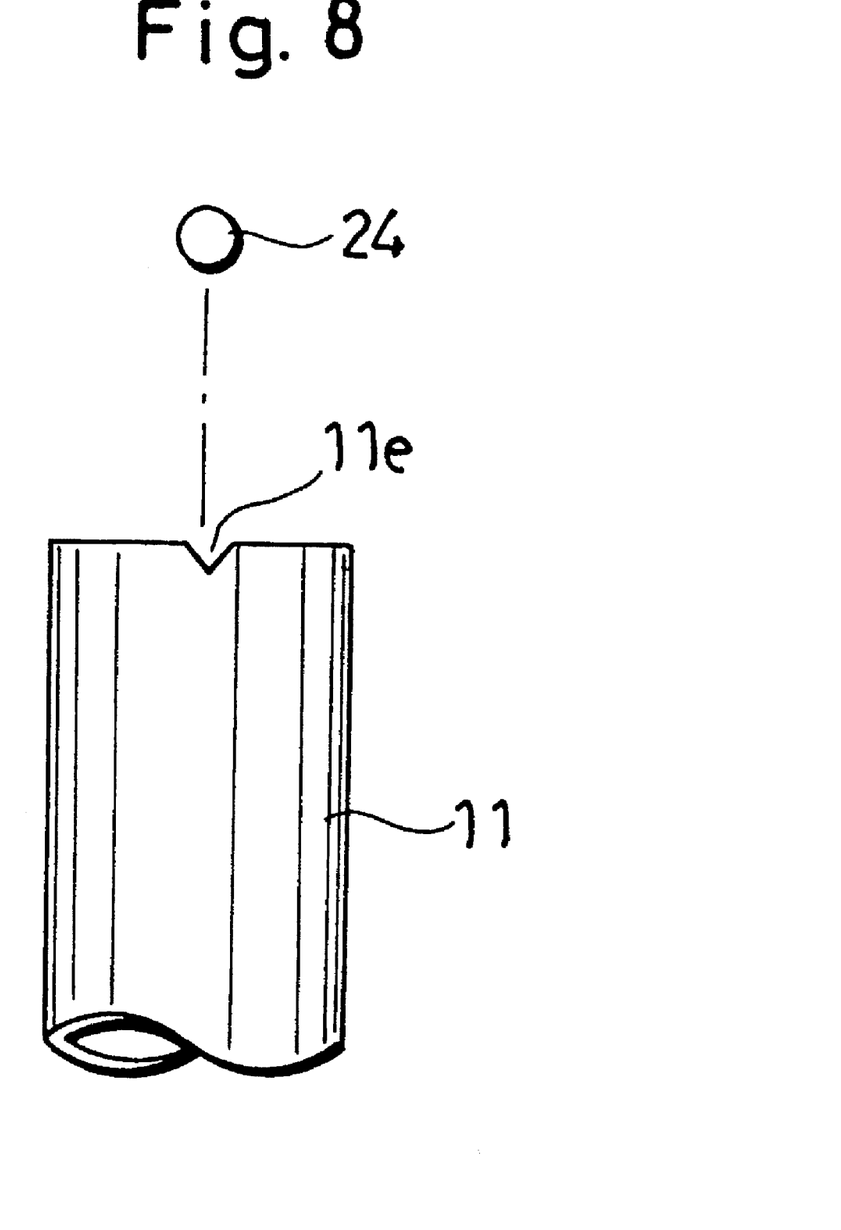
FIG. 8 is a schematic view as seen from the direction of the arrow Y in FIG. 7.

Further, the rotation stopper mechanism of the tine 11 may also be constructed by a combination of a relatively long knock pin 24 which is capable of reaching the larger diameter portion 31b and an engaging recess 11e formed as a notch on the upper end surface of the tine 11 (FIGS. 7 and 8). In this case, however, a ring-like engaging protrusion 11f is formed, as shown in FIG. 7, on the tine 11 instead of a larger diameter head portion 11b so that the steel balls 25, 25 retain the tine 11 by holding the lower edge of the engaging protrusion 11f. Further, the outer cylinder 22 is without a larger diameter portion 22a and is formed into a ring-like shape which is relatively short in the axial direction. Accordingly, the compression coiled spring 23 is exposed to the outside. It should be noted that the shaft portion 31c of the internal member 31 is without a sloped surface 31c1.

Figure 9:
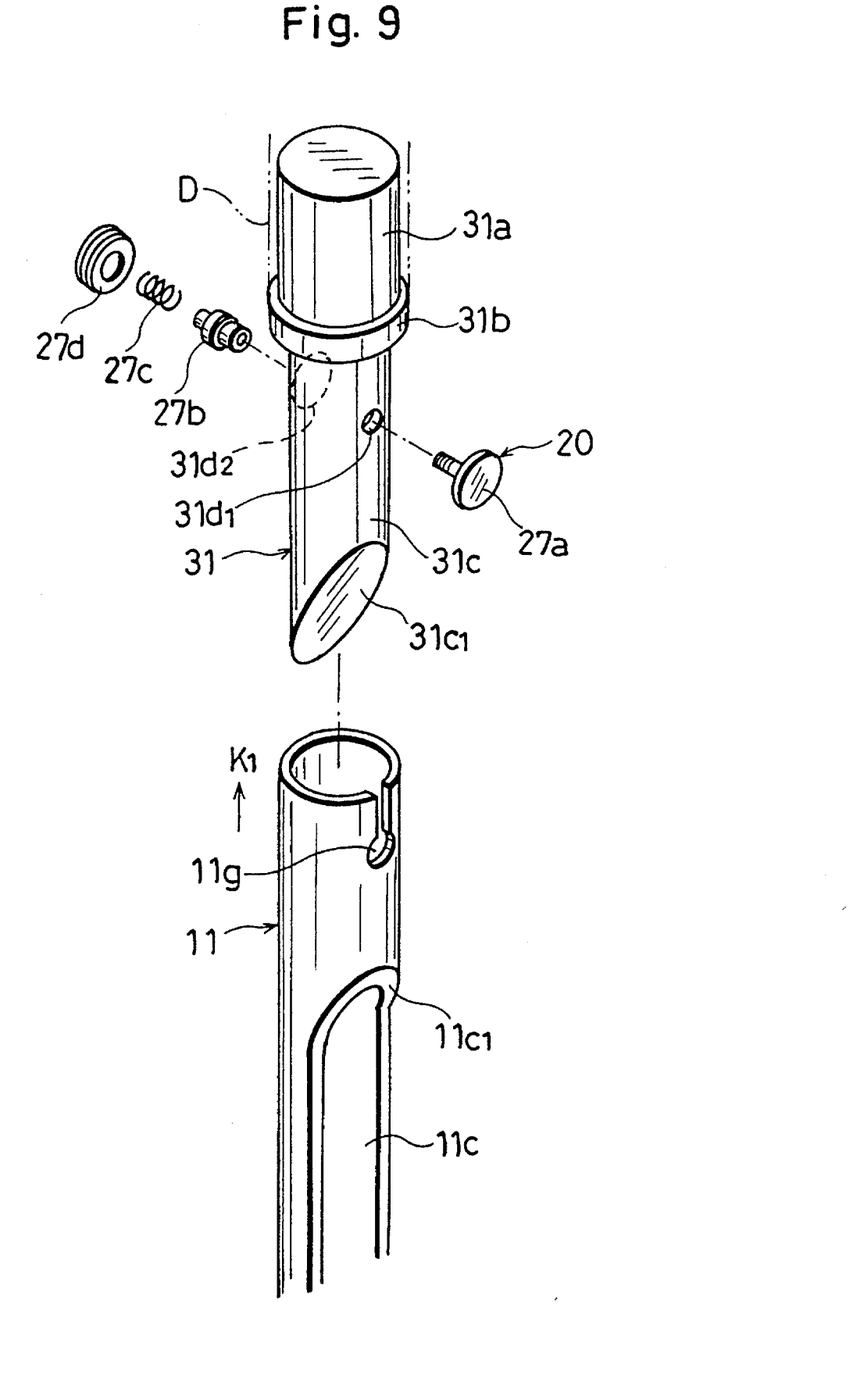
FIG. 9 is an exploded perspective view showing the construction of the second embodiment of the present invention.
Figure 10:
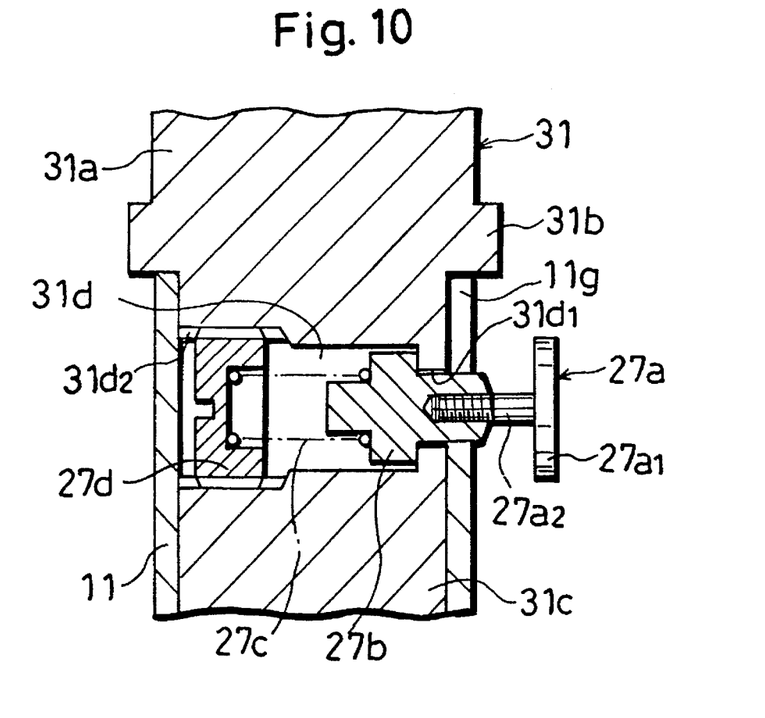
FIG. 10 is an enlarged cross sectional view of certain portions of FIG. 9.
Figure 11:
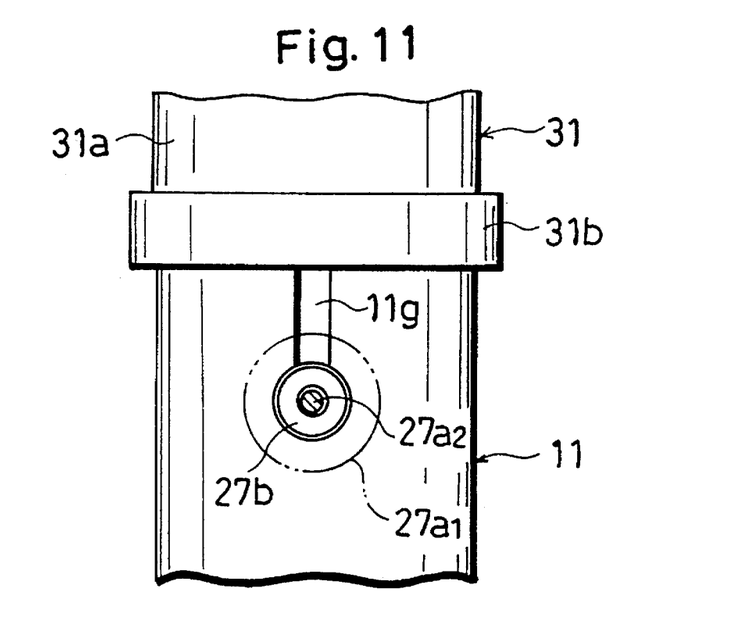
FIG. 11 is a side view corresponding to FIG. 10 as seen from the right side thereof.

Moreover, it is also possible that the tine 11 is removably mounted by way of the coupler 20 onto the internal member 31 which is connected to the driving portion D of the machine body (FIGS. 9 and 10). In this case, the internal member 31 is connected to the driving portion D by means of screw (not shown).

The coupler 20 of the present embodiment comprises an operating knob 27a, an engaging block 27b, a compression coiled spring 27c and a screw plug 27d which are incorporated into a stepped hole 31d of the internal member 31. It should be noted in this case that a keyhole-like engaging portion 11g is formed at the upper end portion of the tine 11.

The above described stepped hole 31d is formed in the diametrical direction of the internal member 31 at the upper portion of the shaft 31c of the internal member 31. One end thereof is opened on the barrel portion of the shaft 31c as a smaller diameter hole 31d1 while the other end thereof is opened on the barrel portion of the shaft 31c opposite to the smaller diameter hole 31d1 as a larger diameter female screw portion 31d2 into which the screw plug 27d may be screwed. The engaging block 27b is accommodated in the stepped hole 31d together with the compression coiled spring 27c and the screw plug 27d. The operating knob 27a is formed of a disk-like operation portion 27a1 and a portion 27a2 protruding from the operating portion 27a1, and the male screw portion 27a2 is screwed into a forefront portion of the engaging block 27b to be attached thereto. Here, the forefront portion of the engaging block 27b projects to the outside of the shaft 31c through the smaller diameter hole 31d1 of the stepped hole 31d. The engaging portion 11g of the tine 11 is constructed such that the diameter of a circular hole at the lower portion thereof corresponds to the outer diameter of the forefront portion of the engaging block 27b (FIG. 11) and the width of a slit opened along the axial direction of the tine 11 is slightly larger than the outer diameter of the male screw portion 27a2 of the operating knob 27a.

The male screw portion 27a2 of the operating knob 27a is able to pass through the slit of the engaging portion 11g. Therefore, in the state where the engaging block 27b is pushed into the stepped hole 31d against the force of the compression coiled spring 27c by pressing the operating knob 27a, the tine 11 may be attached to the shaft portion 31c of the internal member 31 from the bottom thereof (in the direction indicated by arrow K1 in FIG. 9), by positioning the slit of the engaging portion 11g of the tine 11 just under the male screw portion 27a and by advancing it accordingly. Then, upon releasing of the pressing force on the operating knob 27a when the male screw portion 27a2 has reached the circular hole of the engaging portion 11g, the forefront portion of the engaging block 27b is caused to project from the circular hole of the engaging portion 11g by the force of the compression spring 27c, completing attaching of the tine 11 to the internal member 31. This is because the forefront portion of the engaging block 27b corresponds to the circular hole of the engaging portion 11g and cannot pass through the slit of the engaging portion 11g.

When the tine 11 is to be removed from the internal member 31, it suffices to push the engaging block 27b into the stepped hole 31d by pressing the operating knob 27a and then to downwardly pull out the tine 11 (in the direction opposite to the arrow K1 in FIG. 9).

Figure 12:
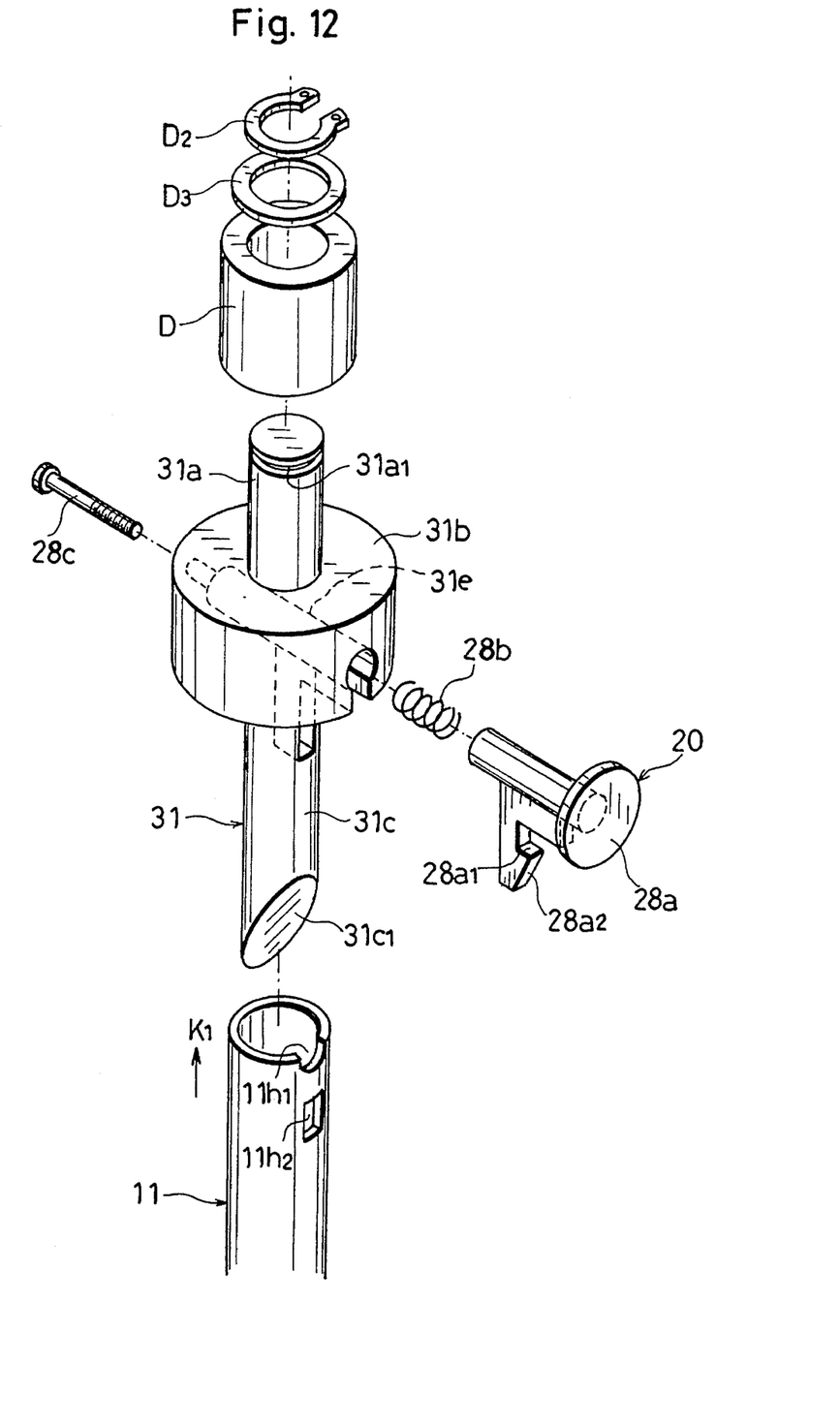
FIG. 12 is an exploded perspective view showing the modification of the second embodiment.
Figure 13:
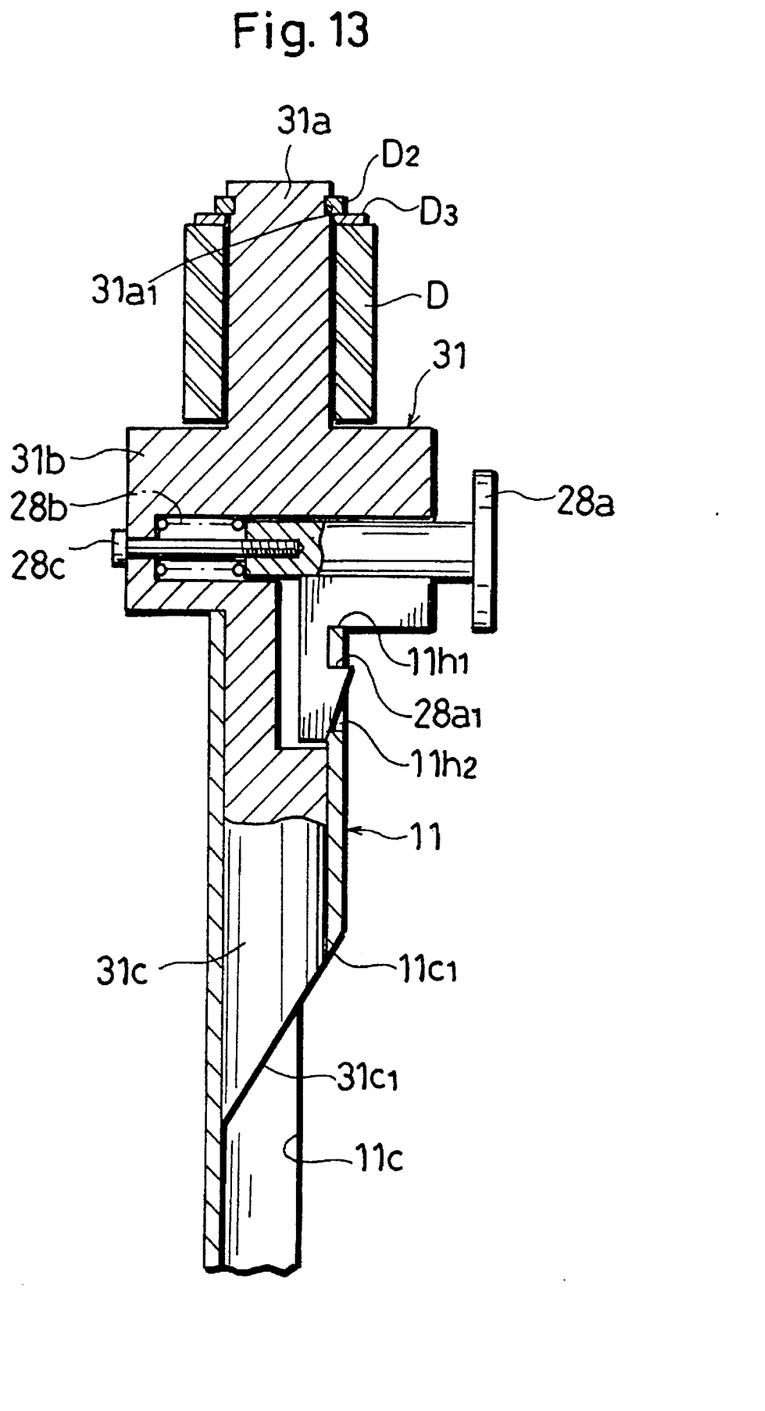
FIG. 13 is an enlarged cross sectional view of certain portions of FIG. 12.
Figure 14:
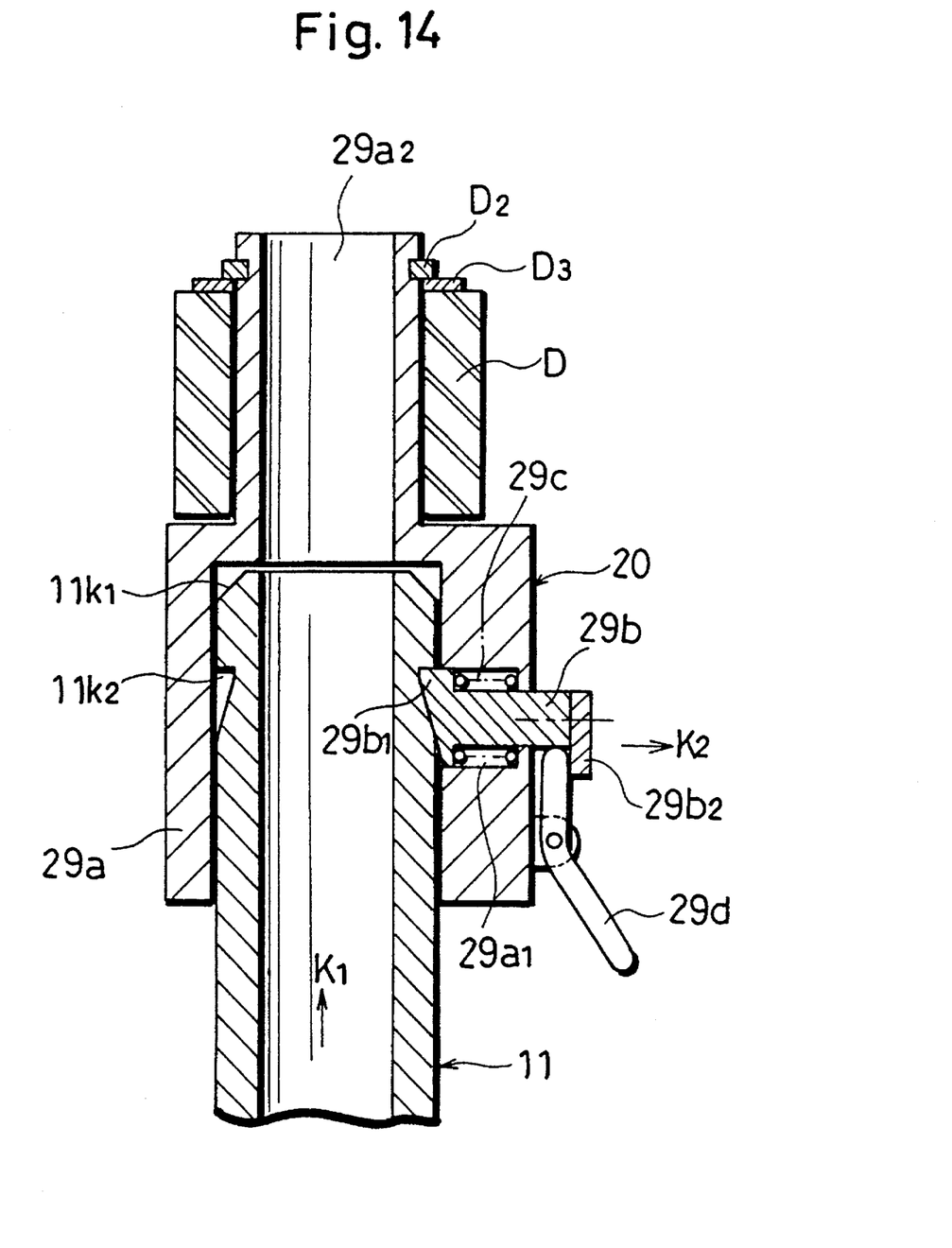
FIG. 14 is an enlarged cross sectional view of certain portions showing the structure of the third embodiment of the present invention.

As shown in FIGS. 12 and 13, it is furthermore possible that the coupler 20 comprises an operating knob 28a having a hook 28a1, a compression coiled spring 28b and a screw 28c. Here, a storage space 31e is formed from a flange portion 31b to a shaft portion 31c of the internal member 31 in order to accommodate the stopper screw 28c, the compression coiled spring 28b and the hook 28a1 of the operating knob 28a. Further, a semicircular cutout 11h1 corresponding to the support portion of the operating knob 28a and a rectangular holding hole 11h2 capable of holding the hook 28a1 are formed, respectively, at the upper end of the tine 11.

Now, when the tine 11 is fitted onto the shaft portion 31c of the internal member 31 (in the direction of arrow K1 in FIG. 12) such that the cutout 11h1 or holding hole 11h2 correspond to the hook 28a1 of the operating knob 28a, edge of the cutout 11h1 presses a slope 28a2 at the lower portion of the hook 28a1 to move the operating knob 28a toward the direction along which it is pushed into the stepped hole 31e, so that the tine 11 may be attached to the internal member 31 in a simple motion. This is because, when the upper end of the tine 11 reaches the lower surface of the flange portion 31b, the hook 28a1 projects from the holding hole 11h2 to be able to hold the tine 11 (FIG. 13).

It should be noted that, in FIGS. 12 and 13, a groove 31a1 for a stopper ring D2 is formed at the upper end of the attaching portion 31a of the internal member 31. Thereby, the internal member 31 may be connected to a circular cylindrical driving portion D through the stopper ring D2 and washer D3.

Further, in FIGS. 9 and 12, the coupler 20 is to be incorporated, in relation to the internal member 31, in the same direction as the direction of the slope 31c1 of the shaft 31c thereof, and the engaging portion 11g, the cutout 11h1 and the holding hole 11h2 are formed in the same side as the face of the elongated hole 11c. Further, when the tine 11 is attached to the internal member 31, the slope 31c1 is formed in the same plane as the slope 11c1 at the upper cross section of the elongated hole 11c.

Furthermore, as shown in FIG. 14, it is also possible to removably mount the tine 11 onto the tine driving portion D of the machine body M through the coupler 20, without using an internal member 31.

In the present embodiment, the coupler 20 comprises a stepped cylindrical support 29a, and a hook member 29b, a compression coiled spring 29c and an operating lever 29d which are mounted onto a larger diameter portion of the support 29a, a smaller diameter portion of the support 29a being connected to the cylindrical driving portion D through a washer D3 and a stopper ring D2. The hook member 29b has a holding piece 29b1 of an inverted triangular shape which projects toward the inner side of the support 29a. The other end of the holding piece 29b1 is caused to project from the outer wall of the support 29a. An engaging piece 29b2 is attached thereto so that it may be interlocked with the operating lever 29d. The hook member 29b is mounted in the storage space 29a1 formed in the larger diameter portion of the support 29a together with compression coiled spring 29c. The hook member 29b may be moved toward the outer side of the support 29a (direction of arrow K2 in FIG. 14) by means of the operating lever 29d which is attached in a manner capable of being oscillated to the outer wall of the support 29a. At this time, the holding piece 29b1 should be completely withdrawn from the inner surface of the support 29a.

On the other hand, an upwardly converging slope 11k1 is formed at the upper end of the tine 11 and a ring-like engaging groove 11k2 which converges upwardly corresponding to the shape of the holding piece 29b1 is formed under the sloped surface 11k1. The inner diameter of the larger diameter portion of the support 29a corresponds to the outer diameter of the tine 11 and the inner diameter of the smaller diameter portion thereof forms a through hole 29a2 of the same diameter as the inner diameter of the tine 11. In other words, the through hole 29a2 is in communication with the tine 11 and is opened at the upper portion thereof.

When the upper end portion of the tine 11 is inserted into the lower portion of the support 29a (in the direction of arrow K1 in FIG. 14), the tine 11 is moved while pushing the hook member 29b outwardly by the slope 11k1 at the upper end thereof. Upon a further insertion, the holding piece 29b1 is held together with the engaging groove 11k2 by the urging force of the compression coiled spring 29c. Thereby, the tine 11 may be attached to the support 29a in a simple motion. When the tine 11 is to be removed, the hook member 29b is pulled out by pressing the operating lever 29d in the direction opposite to the direction of the arrow K2, thereby the engaging hook 29b1 is separated from the engaging groove 11k2. In this way, attaching/removing of the tine 11 is possible.

It should be noted in FIG. 14 that an internal member 31 similar to that of FIG. 1 may also be placed internally of the support 29a of the coupler 20.

What is claimed is:

1. A tine device for a soil conditioning aeration machine, the tine device comprising:

a pipe-shaped tine;

a coupler for removably mounting the tine onto a tine driving portion of a soil conditioning machine body, said coupler comprising engaging means and urging means for urging the engaging means against an upper portion of said tine when the upper portion of said tine is inserted in said coupler to removably attach the tine to the coupler; and an internal member to be placed within the coupler, said internal member having a shaft portion capable of being inserted into a rear end position of said tine.

2. A tine device according to claim 1, wherein said shaft portion has a sloped surface formed at a forefront portion thereof, said sloped surface being formed in the same plane as an edge of an upper side cutout of an elongated hole for drawing out soil formed on a barrel portion of said tine.

3. A tine device according to claim 1, wherein said urging means is spring biased toward a position where said urging means urges said engaging means against the tine, such that a sliding movement of said urging means against said spring biasing permits the engaging means to be spaced from the tine to thereby permit a removal of said tine from the coupler.

4. A tine device according to claim 2, wherein said coupler has a rotation stopper mechanism for preventing a rotation of said tine about an axis of said tine.

5. A tine device for a soil conditioning aeration machine, the tine device comprising:

a pipe-shaped tine;

an internal member connected to a tine driving portion of a soil conditioning machine body; and a coupler for removably mounting said tine onto said internal member in a manner which prevents relative movement between said tine and said internal member, said internal member having a shaft portion capable of being inserted into a rear end portion of said tine.

6. A tine device according to claim 5, wherein said coupler comprises a spring biased locking member which extends in a direction substantially perpendicular to a longitudinal direction of said tine and cooperates with an aperture on said tine to removably mount said tine to said internal member.

7. A tine device for a soil conditioning aeration machine, the tine device comprising:

a pipe-shaped tine; and a coupler for removably mounting the tine onto a tine driving portion of a soil conditioning machine body, said coupler having a through hole at an attaching portion, the through hole communicating in a vertical direction with an inner wall of said tine.

* * * * *